(12) United States Patent
Kondoh

(10) Patent No.: US 11,489,929 B2
(45) Date of Patent: Nov. 1, 2022

(54) SYSTEM AND METHOD FOR DETERMINING CLIENT PROGRAM BASED ON LOGIN METHOD

(71) Applicant: RICOH COMPANY, LTD., Tokyo (JP)

(72) Inventor: Naritake Kondoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/027,928

(22) Filed: Sep. 22, 2020

(65) Prior Publication Data
US 2021/0112143 A1 Apr. 15, 2021

(30) Foreign Application Priority Data
Oct. 11, 2019 (JP) .............................. JP2019-188143

(51) Int. Cl.
| H04L 67/00 | (2022.01) |
| H04N 1/00 | (2006.01) |
| H04L 9/40 | (2022.01) |
| H04L 67/51 | (2022.01) |

(52) U.S. Cl.
CPC ............ *H04L 67/34* (2013.01); *H04L 63/083* (2013.01); *H04L 67/51* (2022.05); *H04N 1/00938* (2013.01); *H04L 63/02* (2013.01)

(58) Field of Classification Search
CPC ....... H04L 67/34; H04L 63/083; H04L 67/16; H04L 63/02; H04N 1/00938
See application file for complete search history.

(56) References Cited

U.S. PATENT DOCUMENTS

| 10,541,995 B1* | 1/2020 | Mossier ................. H04L 63/083 |
| 10,909,597 B2* | 2/2021 | Terada ............... G06Q 30/0613 |
| 2003/0069915 A1* | 4/2003 | Clough .................... G06F 21/31 |
| | | 718/100 |
| 2011/0208801 A1* | 8/2011 | Thorkelsson ....... H04L 67/2814 |
| | | 715/764 |
| 2012/0162681 A1* | 6/2012 | Tomita ................... G06F 21/608 |
| | | 358/1.13 |
| 2012/0300268 A1 | 11/2012 | Oseto et al. |
| 2013/0107309 A1 | 5/2013 | Kondoh |
| 2013/0194633 A1 | 8/2013 | Takatsu et al. |
| 2014/0068715 A1 | 3/2014 | Kondoh |
| 2015/0029535 A1 | 1/2015 | Kondoh et al. |
| 2015/0029536 A1 | 1/2015 | Suzuki et al. |
| 2015/0036167 A1 | 2/2015 | Naitoh et al. |
| 2015/0257004 A1* | 9/2015 | Shanmugam ....... H04L 63/0853 |
| | | 455/411 |
| 2015/0370847 A1 | 12/2015 | Kondoh et al. |

(Continued)

FOREIGN PATENT DOCUMENTS

| JP | 2016-004453 | 1/2016 |
| JP | 2019-074995 | 5/2019 |

*Primary Examiner* — Juan M Guillermety
(74) *Attorney, Agent, or Firm* — Xsensus LLP

(57) ABSTRACT

An information processing system, a service providing device, and an information processing method. The information processing system receives a request for downloading a client program to a client terminal from a user operating the client terminal, determines at least one client program from one or more client programs according to the login method of the user, and control to send the determined client program to the client terminal.

14 Claims, 18 Drawing Sheets

(56) References Cited

U.S. PATENT DOCUMENTS

| | | |
|---|---|---|
| 2017/0272587 A1 | 9/2017 | Kondoh |
| 2018/0176268 A1* | 6/2018 | Malatesha ............... H04L 67/20 |
| 2019/0294423 A1* | 9/2019 | Ellis ........................ G06F 8/60 |
| 2020/0097162 A1 | 3/2020 | Hayashi et al. |
| 2020/0241807 A1 | 7/2020 | Kondoh |

* cited by examiner

FIG. 5

| TENANT ID | TENANT NAME | LOCALE | TIME ZONE | TENANT STATUS | NOTE | COUNTRY INFORMATION | SALES REGION | LOGIN METHOD |
|---|---|---|---|---|---|---|---|---|
| 1234567890 | A CO., LTD. | JP | JST | ACTIVE | TENANT OF A CO., LTD. | JAPAN | JP | ALL |
| 1234567891 | B CO., LTD. | JP | JST | ACTIVE | PERSONNEL DEPARTMENT OF B CO., LTD. | JAPAN | JP | SERVICE A |
| 1234567892 | C CO., LTD. | JP | JST | ACTIVE | | JAPAN | JP | MAIL |
| 2345678901 | D CO., LTD. | JP | EST | ACTIVE | | USA | US | SERVICE B |
| 3456789012 | E CO., LTD. | JP | CET | ACTIVE | | FRANCE | EU | ALL |

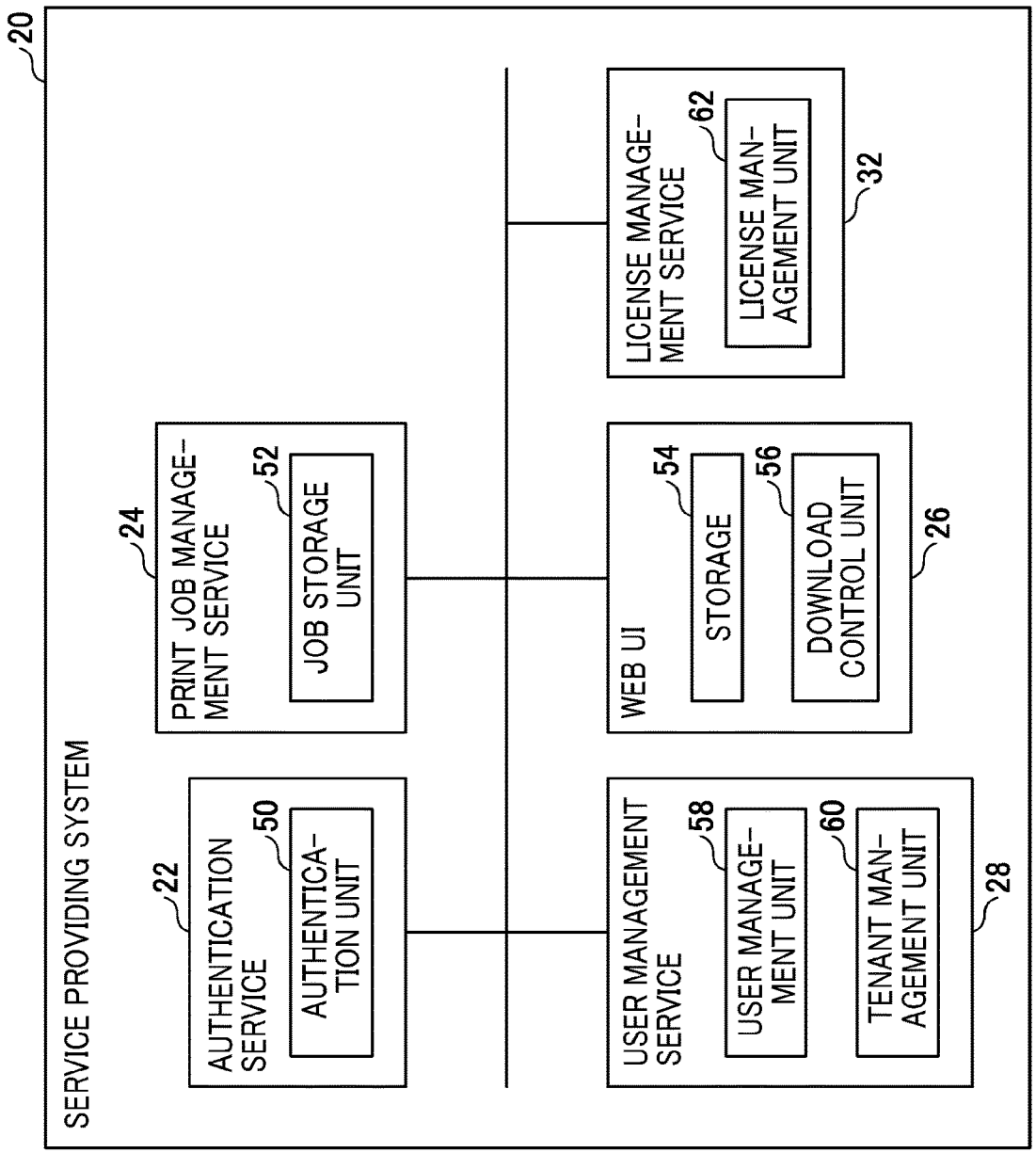

FIG. 16

| LICENSE ID | LICENSE TYPE | CREATED DATE | STATUS |
|---|---|---|---|
| print_app_license | USER | 6/1/2019 | VALID |
| scan_app_license | DEVICE | 7/1/2019 | VALID |

FIG. 17

| MANAGEMENT ID | LICENSE ID | TENANT ID | QUANTITY | LICENSE START DATE | LICENSE END DATE | STATUS |
|---|---|---|---|---|---|---|
| 1 | print_app_license | TENANT A | 100 | 8/1/2019 | 7/31/2019 | VALID |
| 2 | print_app_license | TENANT B | 100 | 8/1/2019 | 7/31/2019 | VALID |
| 3 | scan_app_license | TENANT A | 100 | 8/1/2019 | 7/31/2019 | VALID |
| 4 | scan_app_license | TENANT C | 100 | 8/1/2019 | 7/31/2019 | VALID |

FIG. 18 download.target.license.id= print_app_license

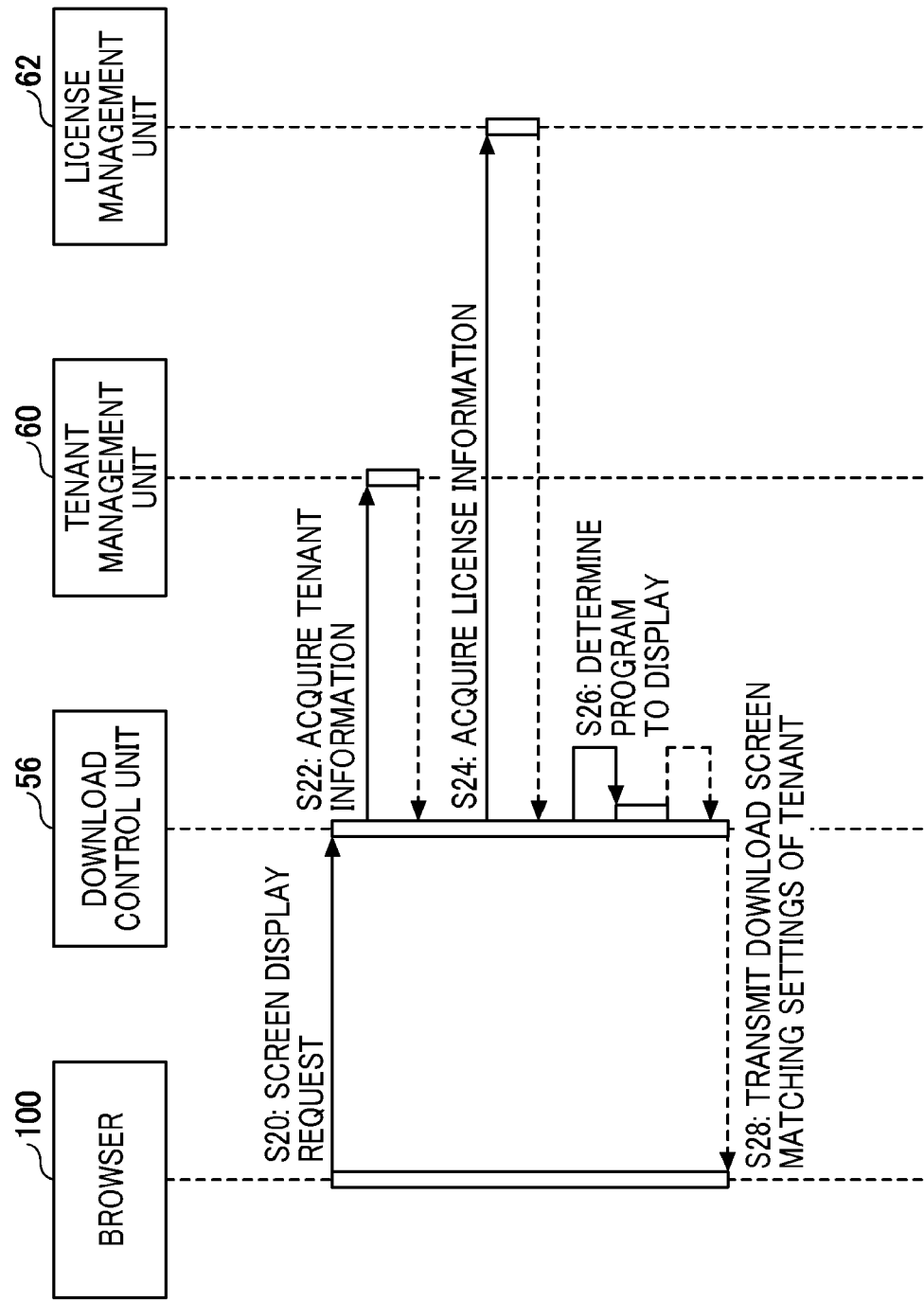

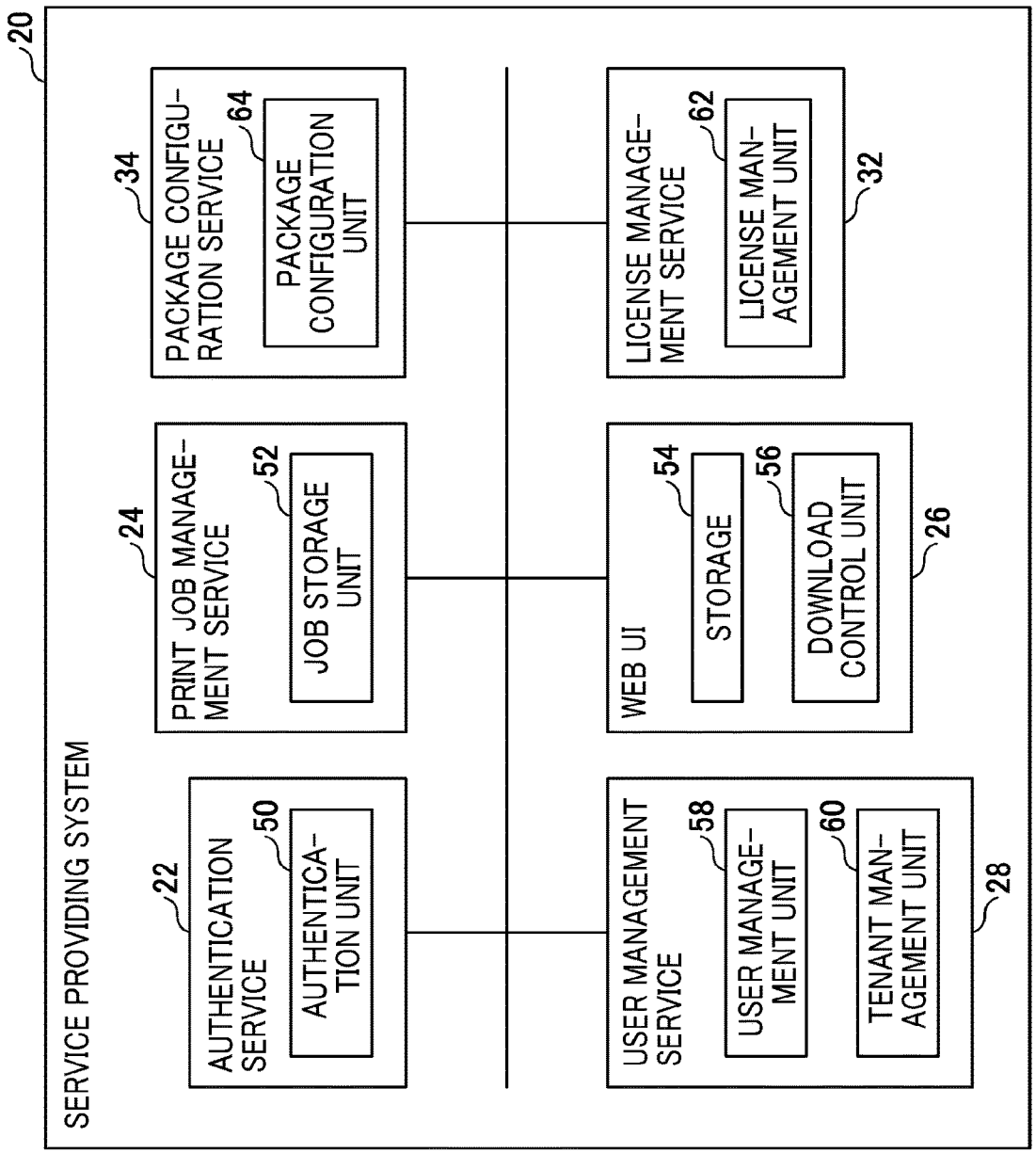

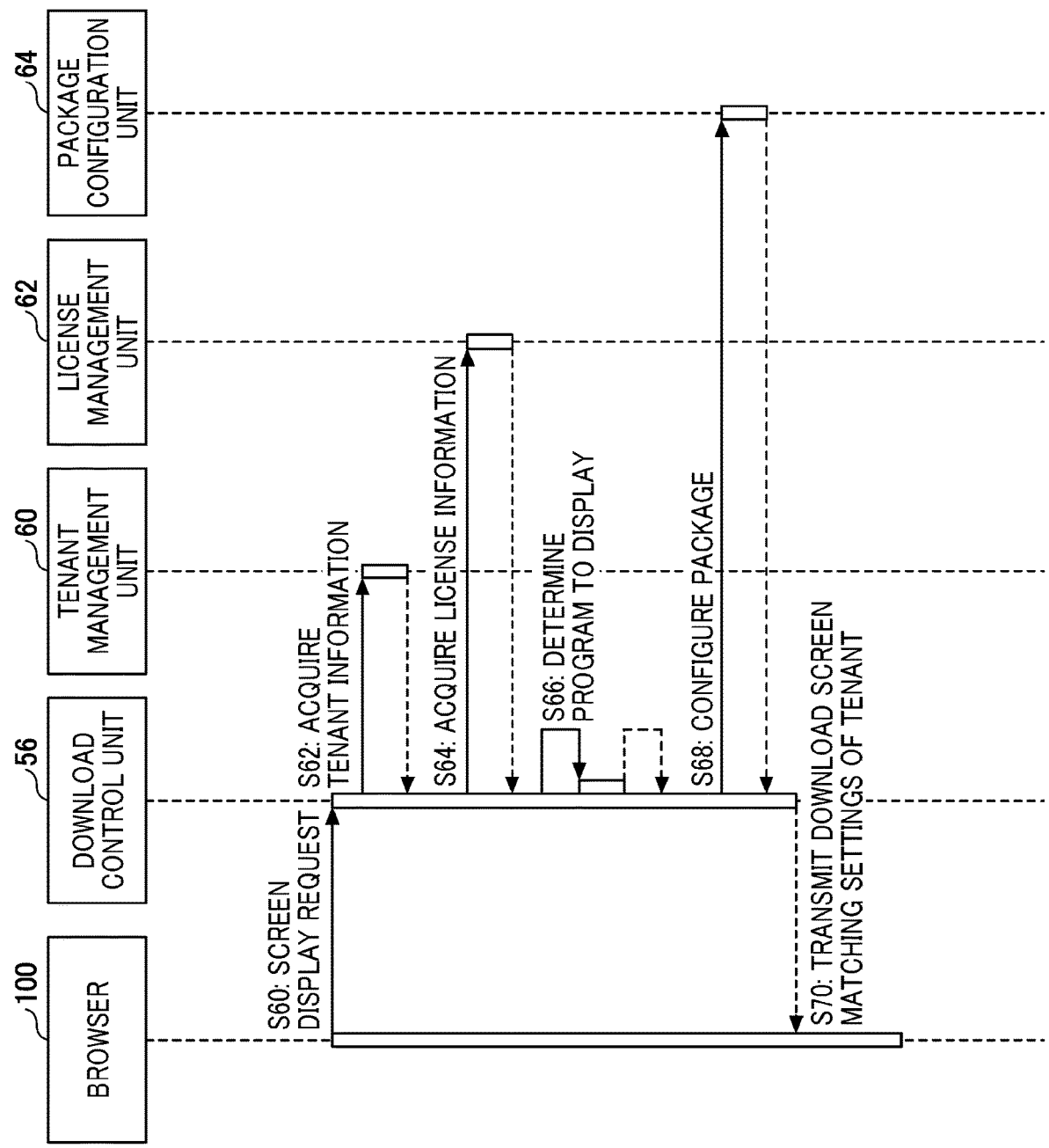

SYSTEM AND METHOD FOR DETERMINING CLIENT PROGRAM BASED ON LOGIN METHOD

CROSS-REFERENCE TO RELATED APPLICATIONS

This patent application is based on and claims priority pursuant to 35 U.S.C. § 119(a) to Japanese Patent Application No. 2019-188143, filed on Oct. 11, 2019, in the Japan Patent Office, the entire disclosure of which is hereby incorporated by reference herein.

BACKGROUND

Technical Field

The present disclosure relates to an information processing system, a service providing device, and an information processing method.

Background Art

A technique that supports introduction of software resources suitable for user's usage environment by configuring test environment based on information of software resources (services and products) and hardware resources already installed by a user is known.

In recent years, authentication provided by external service using a technique such as OAuth authentication are used in service such as cloud service that are used via a network. In order to use such service via the network, a client program may be required to be downloaded to a client terminal, and a common login method is necessary for the service and the client program.

However, there is a drawback that a user who downloads and uses the client program on the client terminal may mistakenly select a client program of a login method different from the service used via the network.

SUMMARY

Embodiments of the present disclosure describes an information processing system, a service providing device, and an information processing method. The information processing system receives a request for downloading a client program to a client terminal from a user operating the client terminal, determines at least one client program from one or more client programs according to the login method of the user, and control to send the determined client program to the client terminal.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 is a diagram illustrating an example of tenant information stored in a tenant management unit;

FIG. 15 is a block diagram illustrating an example of a functional configuration of the service providing system according to a second embodiment of the present disclosure;

FIG. 16 is a diagram illustrating an example of a license information table included in license information;

FIG. 17 is a diagram illustrating an example of a tenant-owned license information table included in license information;

FIG. 18 is a diagram illustrating an example of license information stored in a download control unit necessary for using the client program to be downloaded;

FIG. 19 is a sequence diagram illustrating an example of processing of the information processing system according to the second embodiment of the present disclosure;

FIG. 21 is a block diagram illustrating an example of a functional configuration of the service providing system according to a third embodiment of the present disclosure; and FIG. 22 is a sequence diagram illustrating an example of processing of the information processing system according to the third embodiment of the present disclosure.

Figure 1:
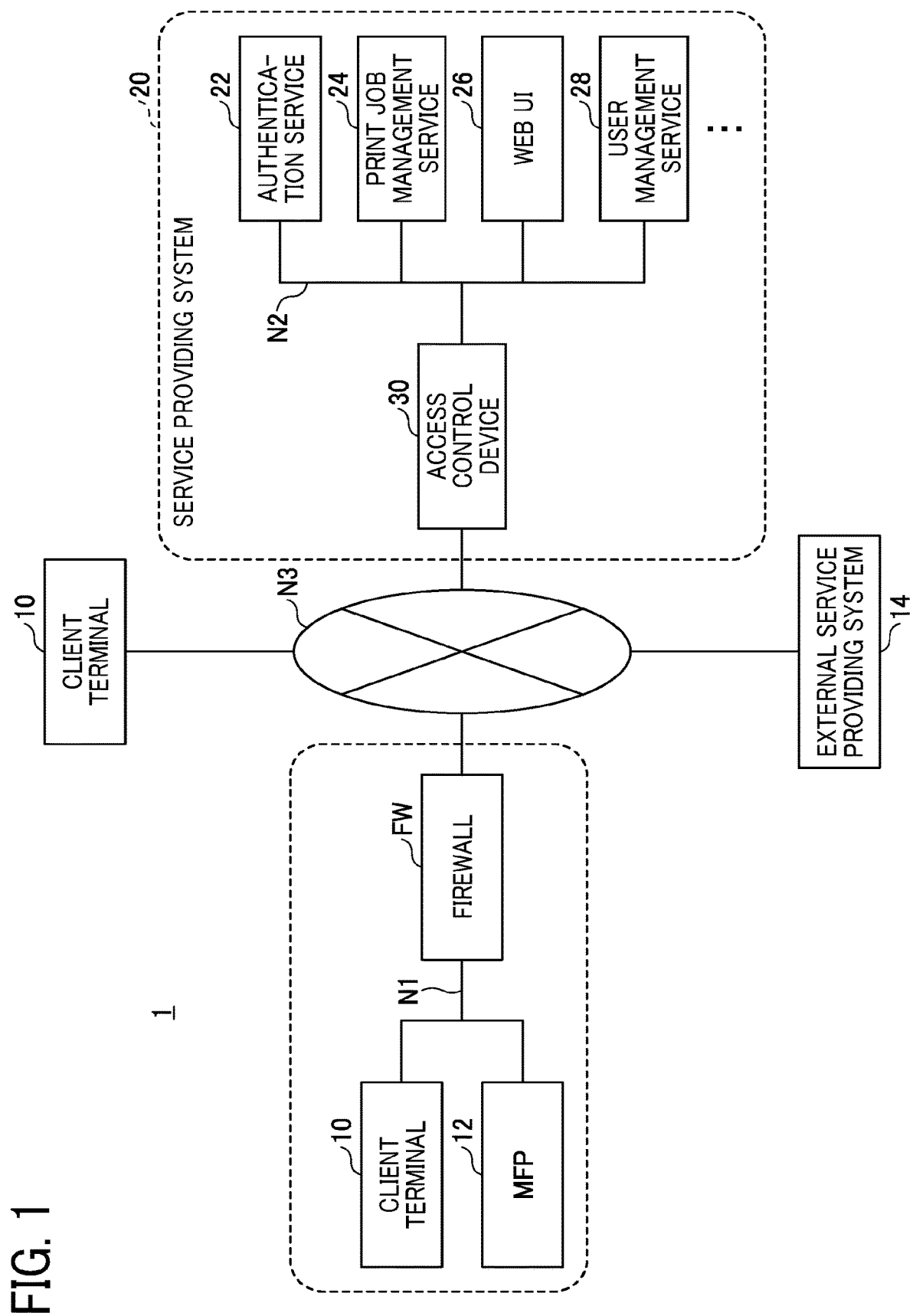
FIG. 1 is a schematic view illustrating a configuration of an information processing system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Embodiments of the present disclosure are described in detail below, with reference to the drawings. In the present embodiment, an example of a tenant is described as an example of a group to which a user belongs, but the present disclosure is not limited to this group, and various groups such as a company, a school, an organization, and a department are included.

FIG. 1 is a schematic view illustrating a configuration of an information processing system according to a first embodiment of the present disclosure. The information processing system 1 of FIG. 1 includes a network N1 such as an office network, a network N2 of a service providing system 20 represented by a cloud service, and a network N3 such as the internet.

The network N1 is a private network inside a firewall FW. A client terminal 10 and a multifunction peripheral (MFP) 12 which is an example of an image forming apparatus are connected to the network N1. The client terminal 10 and the MFP 12 includes a wireless communication function or a wired communication function.

The client terminal 10 is an information processing terminal such as a PC, a smartphone, a mobile phone, or a tablet terminal. The MFP 12 is an image forming apparatus having an image forming function. The image forming apparatus is an apparatus such as a multifunction peripheral, a copier, a scanner, a printer, a projector, or an electronic whiteboard that performs processing related to image formation. Although FIG. 1 illustrates an example in which each of the client terminal 10 and the MFP 12 is one, but a plurality of devices may be provided.

The network N2 is connected to the network N3 through the access control device 30. The access control device 30 is a device such as a load balancer that distributes the load, a firewall, a web application firewall (WAF), antivirus software, an intrusion detection system (IDS), an intrusion prevention system (IPS), or the like. An access control device 30, an authentication service 22, a print job management service 24, a web user interface (UI) 26, and a user management service 28 are connected to the network N2.

In the information processing system 1 of FIG. 1, access control device 30, the authentication service 22, the print job management service 24, the web UI 26, and the user management service 28 implement the service providing system 20. Note that part or all of the service providing system 20 may be called a service providing device.

The access control device 30, the authentication service 22, the print job management service 24, the web UI 26, and the user management service 28 are implemented by one or more information processing devices (computers). The access control device 30, the authentication service 22, the print job management service 24, the web UI 26, and the user management service 28 may be integrated into one information processing device or may be distributed among a plurality of information processing devices.

A part of the services on the network N2 may exist outside the network N2. The client terminal 10 may be outside the network N1. The information processing system 1 in FIG. 1 illustrates an example in which the client terminal 10 is connected to the network N1 and the network N3.

The client terminal 10 and one or more external service providing systems 14 are connected to the network N3. The external service providing system 14 links the authentication with the service providing system 20 and a client program described below by a technique such as OAuth authentication. The external service providing system 14 provides services such as an online storage service. In the present embodiment, in order to distinguish the service provided by the service providing system 20 from the service provided by the external service providing system 14, the service provided by the external service providing system 14 is called an external service.

In the present embodiment, an example of a service (pull print service) in which a print job is transmitted from the client terminal 10 to the service providing system 20 in the information processing system 1 illustrated in FIG. 1 and received and printed by the MFP 12 is described.

When using such a pull print service, the user needs to download the printer driver and the port monitor to the client terminal 10. The port monitor downloaded to the client terminal 10 has to have the same login method as the service providing system 20.

Further, in the present embodiment, a tenant administrator or the like selects the login method to be used by the users belonging to the tenant and sets the selected method in the service providing system 20. The user belonging to the tenant can use the login method set in the service providing system 20 by the tenant administrator or the like.

Therefore, in the present embodiment, to prevent accidental download of the port monitor that cannot be used by the user, the port monitor having login method available to the user is selected and displayed on the download screen (download page) for downloading the printer driver and the port monitor to the client terminal 10.

Note that the download screen may display a program (for example, a package program that can be installed by one click) in which a login port monitor that can be used by the user and a printer driver are packaged.

Figure 2:
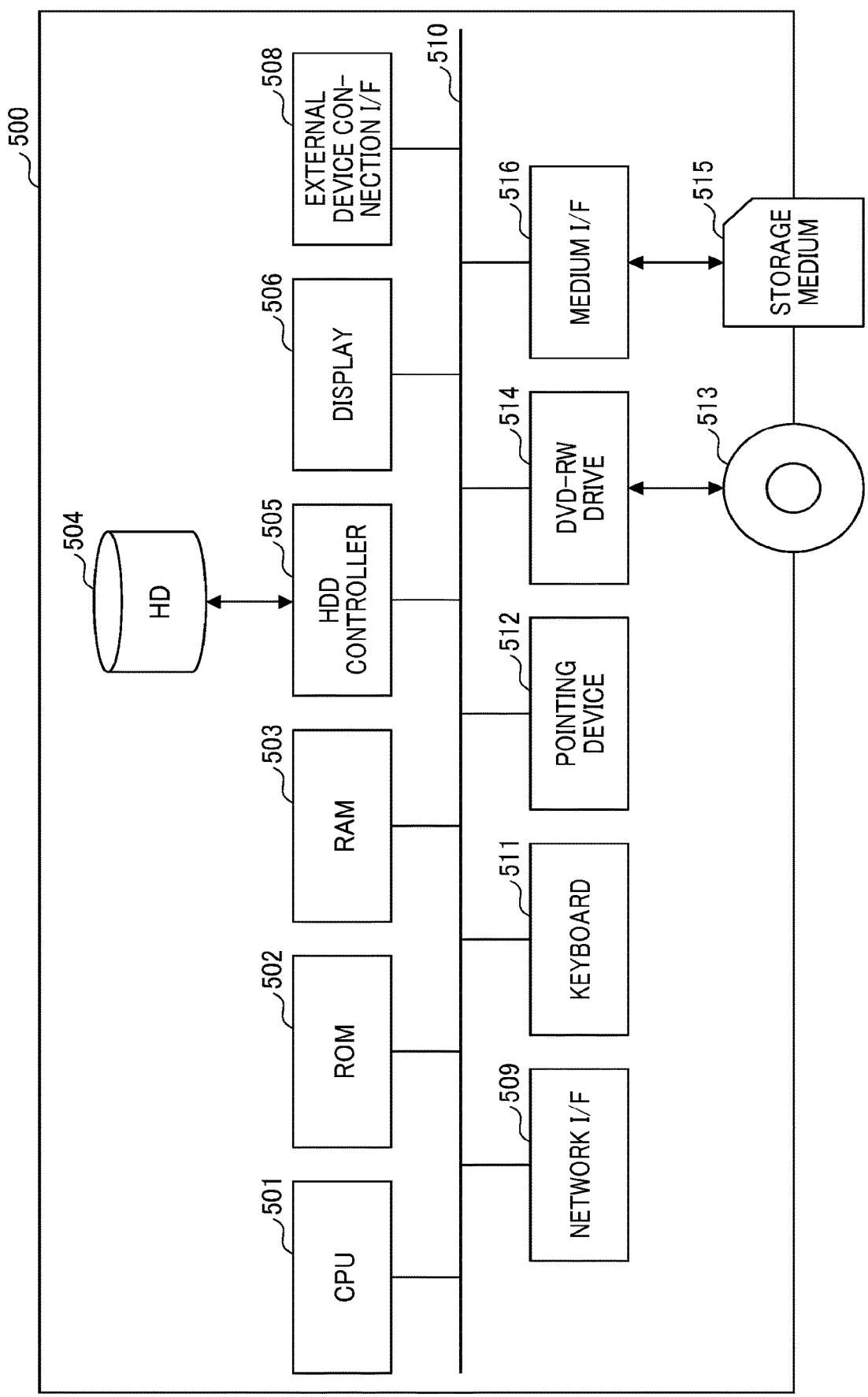
FIG. 2 is a block diagram illustrating an example of a hardware configuration of a computer, according to embodiments of the present disclosure.

The client terminal 10, the external service providing system 14, and the service providing system 20 are implemented by, for example, a computer 500 having the hardware configuration illustrated in FIG. 2.

FIG. 2 is a block diagram illustrating an example of hardware configuration of the computer 500 according to the present embodiment. As illustrated in FIG. 2, the computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a medium I/F 516.

Among these elements, the CPU 501 controls entire operation of the computer 500. The ROM 502 stores a control program such as an initial program loader (IPL) to boot the CPU 501. The RAM 503 is used as a work area for the CPU 501. The HD 504 stores various data such as a control program. The HDD controller 505 controls reading and writing of various data from and to the HD 504 under control of the CPU 501.

The display 506 displays various information such as a cursor, menu, window, character, or image. The external device connection I/F 508 is an interface for connecting various external devices. The external device in this case is, for example, a universal serial bus (USB) memory or a printer. The network I/F 509 is an interface for performing data communication using the networks N1 to N3. The data bus 510 is an address bus, a data bus, or the like for electrically connecting each element such as the CPU 501.

The keyboard 511 is one example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to the storage medium 515 such as a flash memory.

Figure 3:
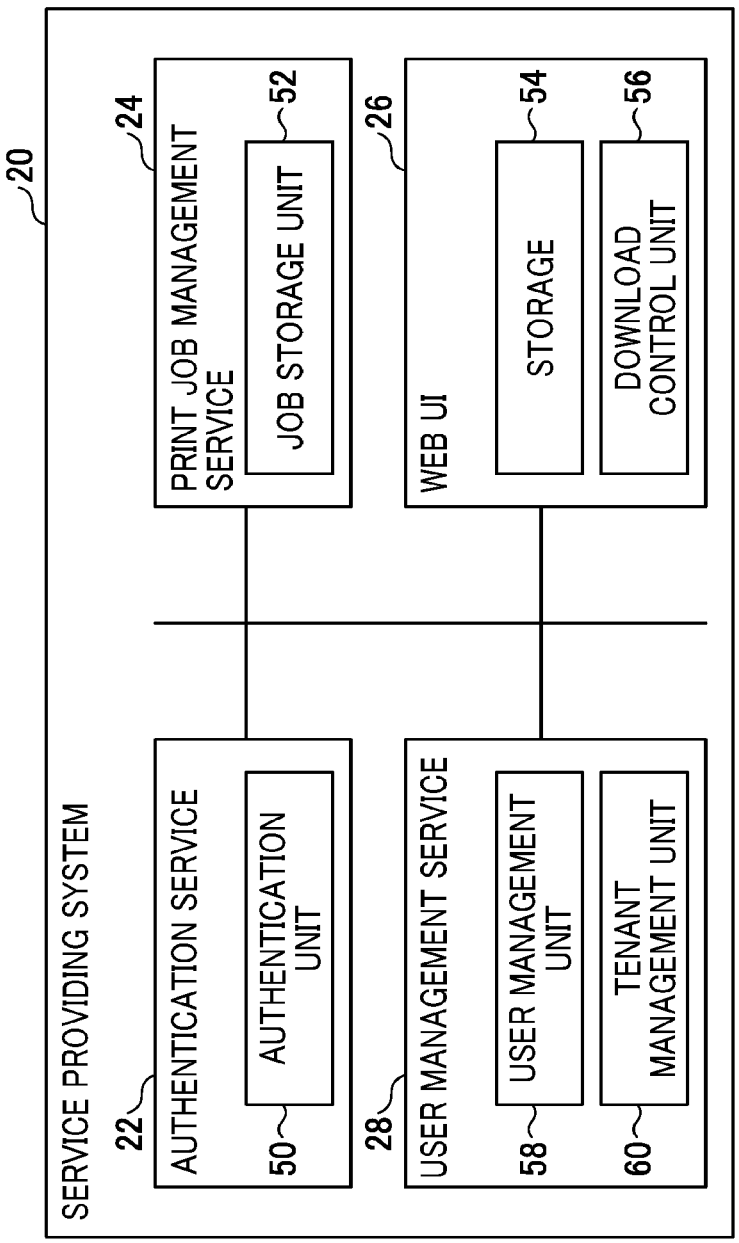
FIG. 3 is a block diagram illustrating an example of a functional configuration of a service providing system.
Figure 4:
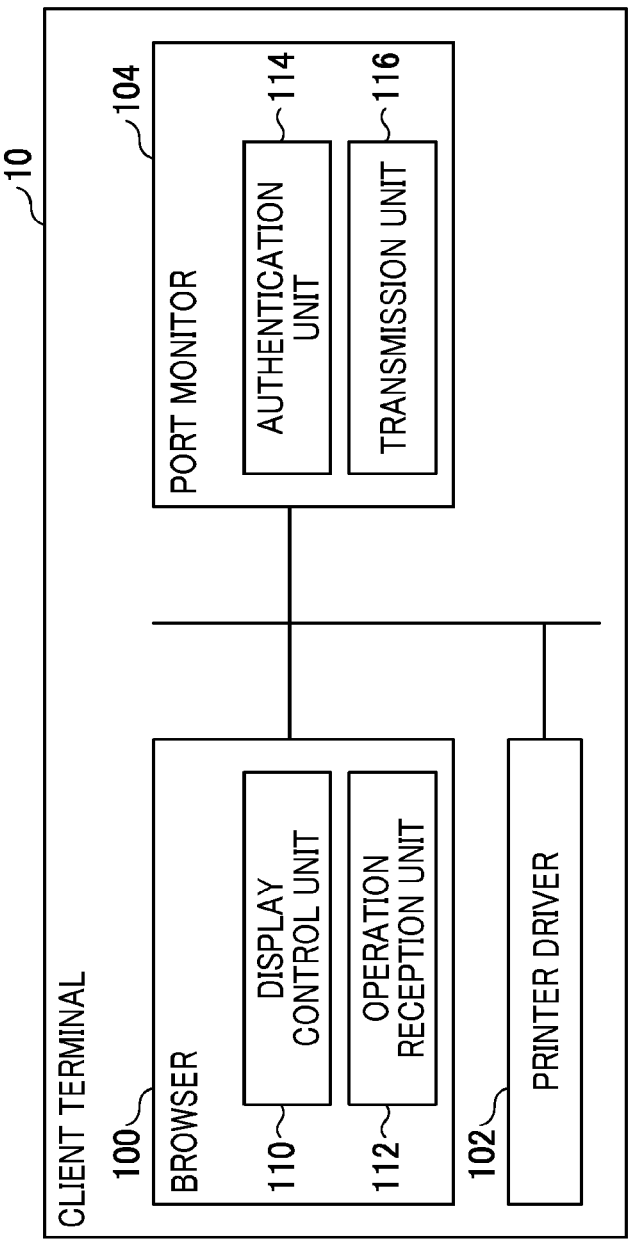
FIG. 4 is a block diagram illustrating an example of a functional configuration of a client terminal.

The functional configurations of the service providing system 20 and the client terminal 10 included in the information processing system 1 is described with reference to FIGS. 3 and 4. FIG. 3 is a block diagram illustrating an example of the functional configuration of the service providing system. FIG. 4 is a block diagram illustrating an example of the functional configuration of the client terminal.

The authentication service 22 of the service providing system 20 of FIG. 3 includes an authentication unit 50. The authentication unit 50 performs user (including tenant) authentication. The authentication unit 50 cooperates with the external service providing system 14 for authentication. The authentication unit 50 stores available login method information set for each tenant.

The job storage unit 52 of the print job management service 24 stores the print job transmitted from the port monitor 104 or the like of the client terminal 10 for each user belonging to the tenant and transmits the print job to the MFP 12 in response to a request from the MFP 12. The job storage unit 52 may store other information such as a storage period and a log.

The storage 54 of the web UI 26 stores the client program to be downloaded. The storage 54 may be a physical disk or a storage service provided by the external service providing system 14. The client program may be the printer driver 102, the port monitor 104, or a package program in which the port monitor and the printer driver are packaged.

The download control unit 56 controls the download screen displayed on the client terminal 10 to control the client program downloadable to the client terminal 10 from the download screen. In this way, the download control unit 56 controls the download of the client program according to the login method available to the user (user's login method).

For example, the download control unit 56 selects and displays a port monitor with login method that can be used by the user of the client terminal 10 or the package program including such port monitor on the download screen to avoid unusable port monitor from accidentally downloaded to the client terminal 10.

The user management unit 58 of the user management service 28 manages information and settings for each user who belongs to the tenant. The user management unit 58 uses, for example, a relational database (RDB) to register, acquire, update, and delete data.

The tenant management unit 60 manages information and settings for each tenant. The tenant management unit 60 uses, for example, the RDB to register, acquire, update, and delete data. The tenant management unit 60 stores tenant information described below.

The client terminal 10 in FIG. 4 includes a browser 100. In addition, the printer driver 102 and the port monitor 104 downloaded from the service providing system 20 are installed in the client terminal 10.

The browser 100 includes a display control unit 110 and an operation reception unit 112. The display control unit 110 controls the display of, for example, a download screen received from the service providing system 20. The operation reception unit 112 receives an operation from the user on the screen displayed on the display control unit 110 and performs processing according to the operation. For example, when the operation reception unit 112 receives a selection of the client program displayed on the download screen from the user, the operation reception unit 112 starts a process of downloading the client program selected by the user.

Note that, for example, the operation reception unit 112 may receive a selection of one client program from a plurality of client programs from a user or may automatically select one client program from the plurality of client programs. For example, when the number of the client programs displayed on the download screen is one, the operation reception unit 112 may automatically select the client program. Further, for example, when there are a plurality of client programs displayed on the download screen, the operation reception unit 112 may automatically select one client program from the client programs according to a condition such as priority or the like.

The printer driver 102 converts an application program file into a Page Description Language (PDL) file that can be printed by the printer. The printer driver 102 may be a printer driver for each model of the MFP 12 or a printer driver common to all models.

The port monitor 104 is a module for transmitting the output of the printer driver 102 to the MFP 12 and the service providing system 20. Since the port monitor 104 according to the present embodiment is an example of the pull print service, the port monitor 104 does not directly send the print job to the MFP 12 but sends the print job to the service providing system 20.

The port monitor 104 includes an authentication unit 114 and a transmission unit 116. The authentication unit 114 performs user authentication and the like on the service providing system 20 when uploading a print job to the service providing system 20. The transmission unit 116 transmits the print job to the service providing system 20.

FIG. 5 is a diagram illustrating an example of tenant information stored in the tenant management unit. The tenant information of FIG. 5 includes a tenant identifier (ID), a tenant name, a locale, a time zone, tenant status, description, country information, a sales region, and login method as items.

The tenant ID is an example of identification information for uniquely identifying the tenant. The tenant name is the name of the tenant. Locale represents the display language of the tenant. The time zone represents the time zone of the tenant (area that uses common standard time). The tenant status represents status of the tenant such as active or not active. The description is a description of the tenant. Country information represents the country to which the tenant belongs. The sales region represents a region of a sales company.

The login method represents one or more login methods to be used by users belonging to the tenant. For example, the login method includes a method using a user ID and password, a method using a mail address and password, and a method using external service cooperation (cooperation with the external service providing system 14). The tenant information login method "All" in FIG. 5 indicates that all login methods can be used.

Figure 6:
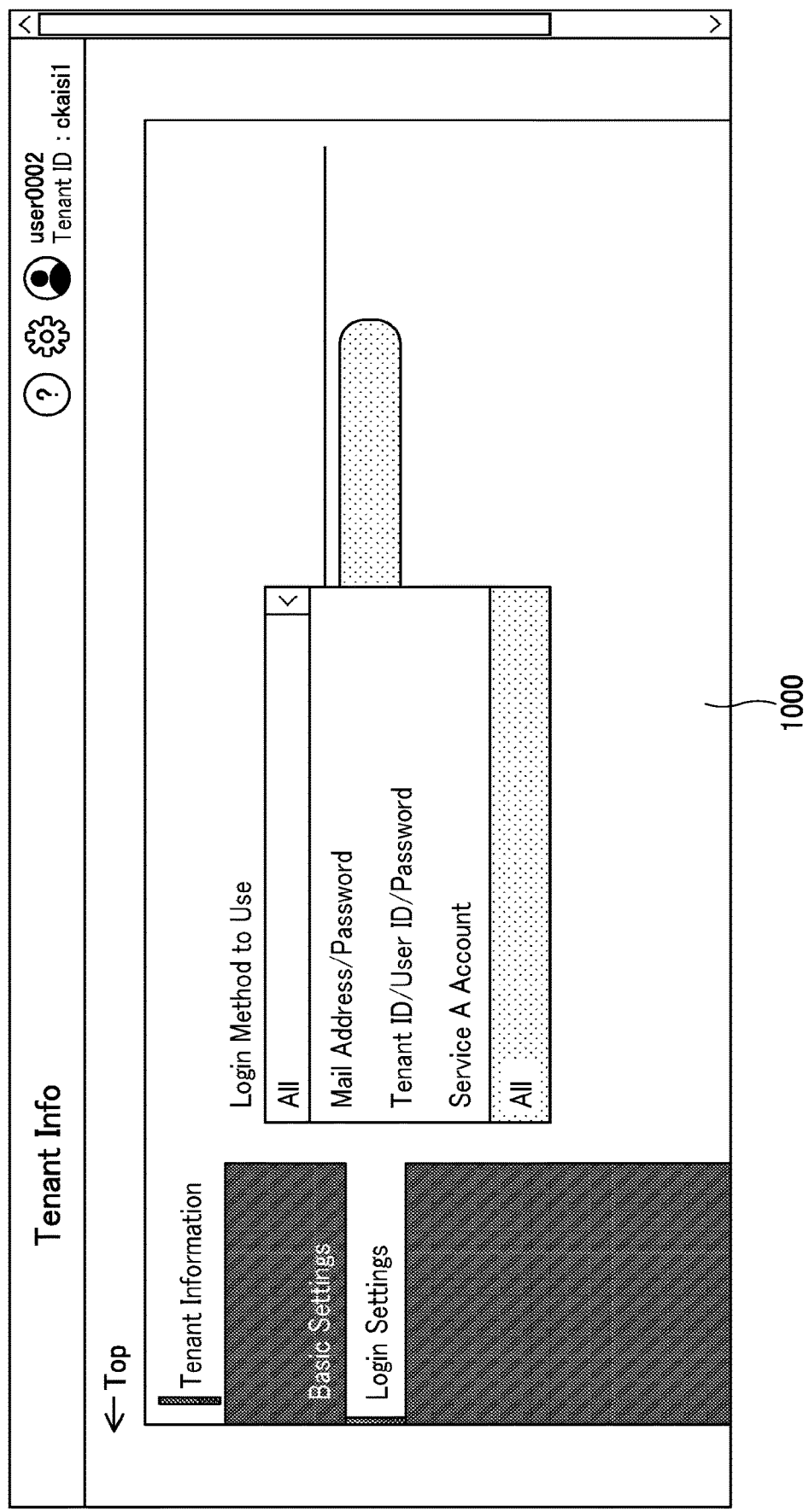
FIG. 6 is a diagram illustrating an example of a tenant information setting screen on which an administrator or the like sets a login method.

The tenant administrator or the like can select and set the login method to be used by the users belonging to the tenant from a tenant information setting screen 1000 illustrated in FIG. 6, for example. FIG. 6 is a diagram illustrating an example of a tenant information setting screen on which an administrator or the like sets the login method.

Figure 7:
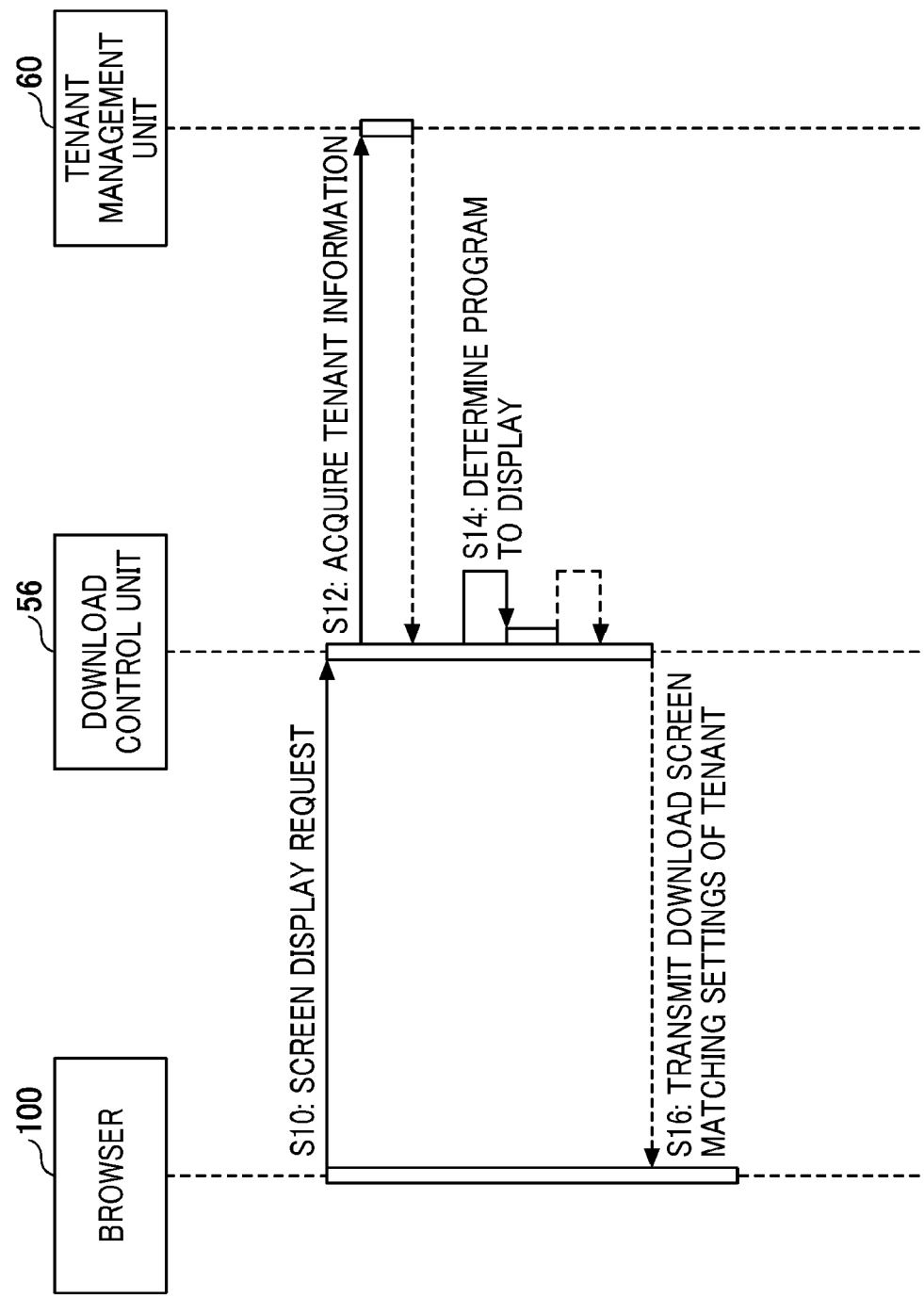
FIG. 7 is a sequence diagram illustrating an example of processing executed by the information processing system according to embodiments of the present disclosure.

A description is given below of an operation or process according to the present embodiment. In the present embodiment, an example in which a user belonging to a tenant displays a download screen on the client terminal 10 is described. FIG. 7 is a sequence diagram illustrating an example of the process executed by the information processing system according to the present embodiment.

The user belonging to the tenant performs an operation for displaying the download screen on the browser 100 of the client terminal 10. Note that, in FIG. 7, a login process and the like for the service providing system 20 are omitted.

In step S10, the browser 100 requests the download control unit 56 of the service providing system 20 to display the download screen. In step S12, the download control unit 56 acquires the tenant information of the logged-in user from the tenant information of the tenant management unit 60 illustrated in FIG. 5.

In step S14, the download control unit 56 determines the client program to be displayed on the download screen according to the login method of the tenant information acquired in step S12. Then, the download control unit 56 creates image data of the download screen that matches the settings of the tenant including the client program to be displayed on the determined download screen. In step S16, the download control unit 56 transmits the image data of the download screen matching the tenant settings to the browser 100 of the client terminal 10 to display the download screen 1002 as illustrated in FIG. 8 or 9, for example.

Figure 8:
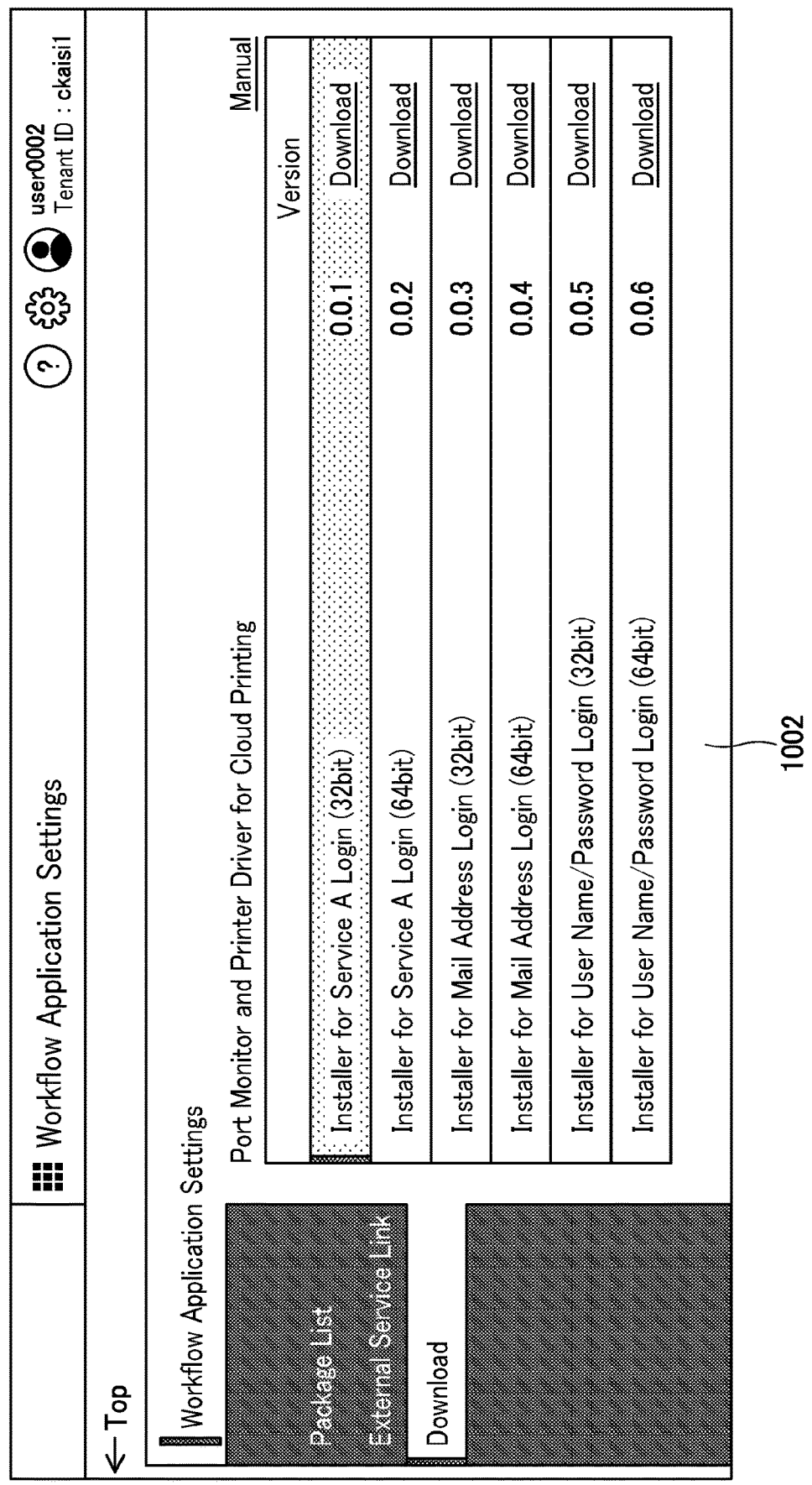
FIG. 8 is a diagram illustrating an example of a download screen of a tenant that can use all login methods.

FIG. 8 is a diagram illustrating an example of the download screen of a tenant that can use all login methods. FIG. 9 is a diagram illustrating an example of the download screen of a tenant whose available login methods are limited.

Figure 9:
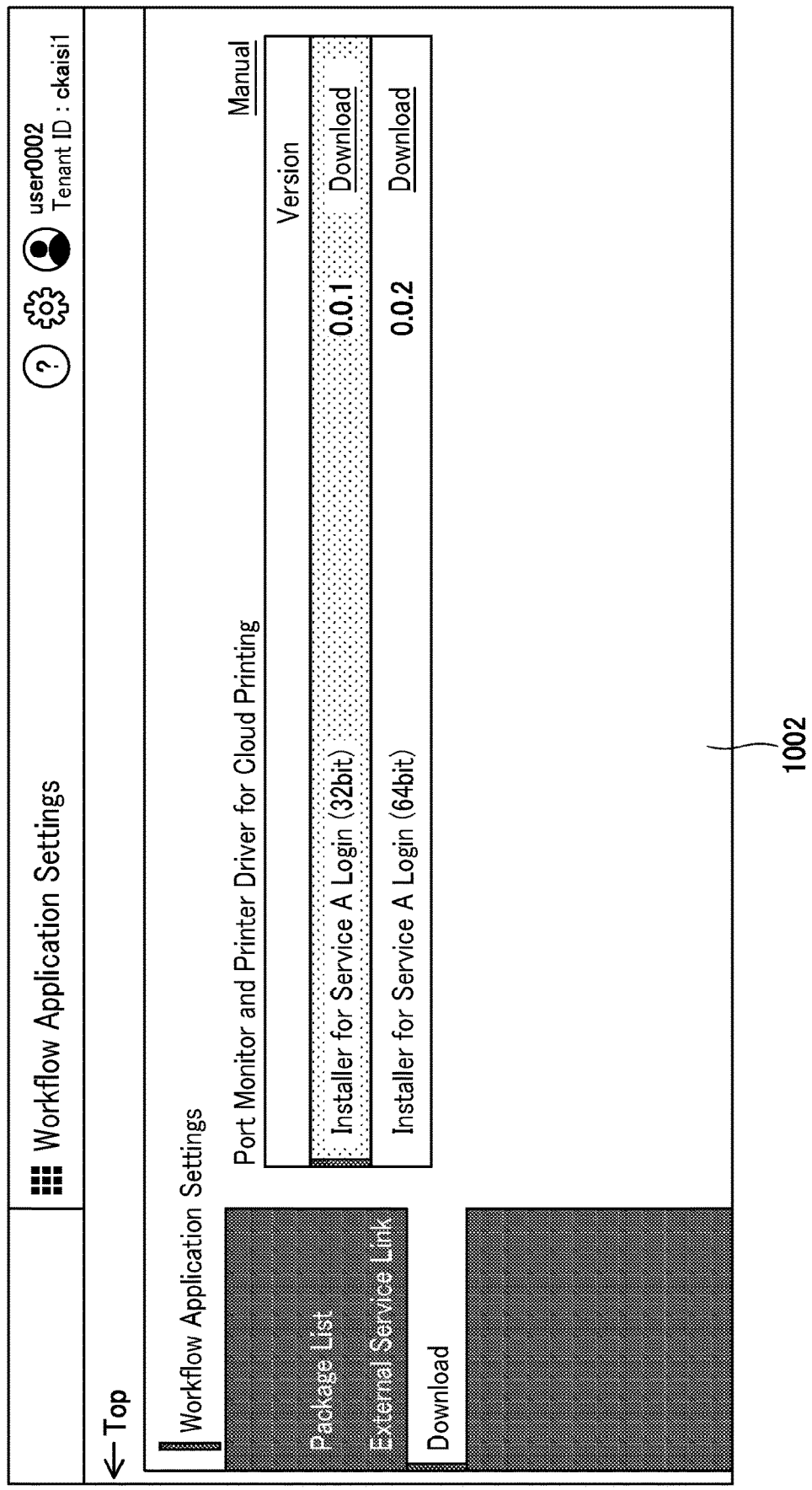
FIG. 9 is a diagram illustrating an example of the download screen of tenant whose available login methods are limited.

On the download screen 1002 of FIG. 8 and FIG. 9, an installer for each combination of the port monitor 104 for each login method available to the tenant and the printer driver 102 (for example, a service A login installer or a mail address login installer) is displayed as downloadable installer.

As illustrated in the download screen 1002 of FIGS. 8 and 9, the downloadable installer displayed on the download screen 1002 changes according to the login method set in the tenant information of the tenant to which the logged-in user belongs. Specifically, the downloadable installer displayed on the download screen 1002 of FIGS. 8 and 9 is a package program including the port monitor 104 that has login method usable by the logged-in user. The download screen 1002 of FIGS. 8 and 9 may be provided with a button or the like for accepting a display request of the details of the printer driver 102 and the port monitor 104 included in the package program from the user. When the button or the like is pressed, details of the printer driver 102 and the port monitor 104 included in the above package program may be displayed.

Further, in the case where one installer is automatically selected from the downloadable installers displayed on the download screen 1002 of FIGS. 8 and 9, the download screen 1002 may not be displayed and alternatively, a download start screen for downloading the automatically selected installer may be displayed.

In the case where one installer is automatically selected from the downloadable installers displayed on the download screen 1002 of FIGS. 8 and 9, the installer download may be started automatically after selected installer is displayed on the download screen 1002.

Therefore, according to the download screen 1002 of FIGS. 8 and 9, accidental download of the port monitor 104 that cannot be used by the user is prevented.

Figure 10:
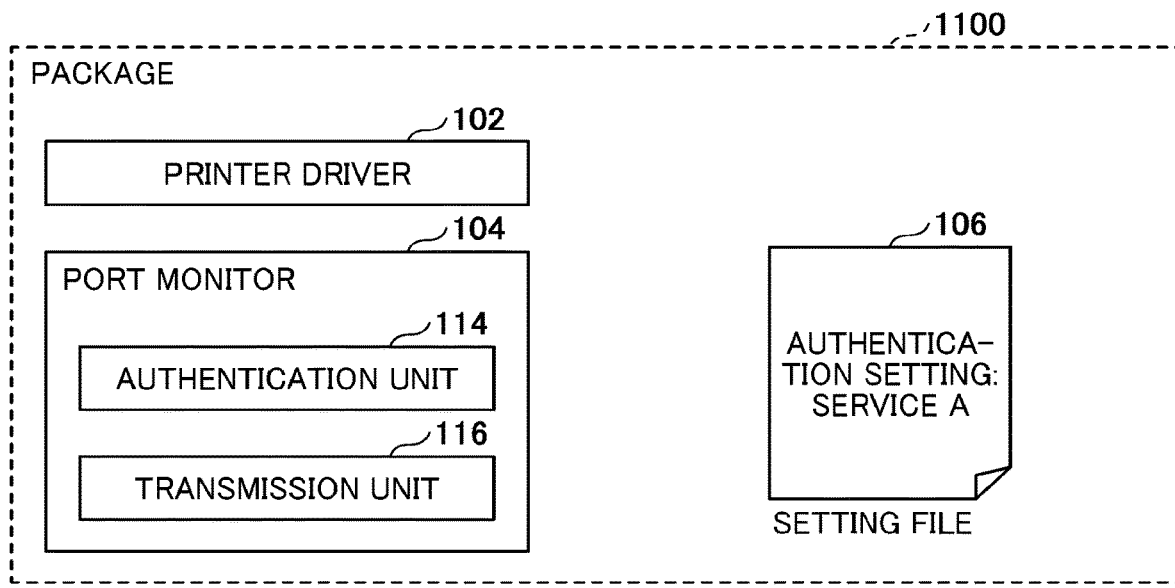
FIG. 10 is a block diagram illustrating an example of a package program to be downloaded.
Figure 11:
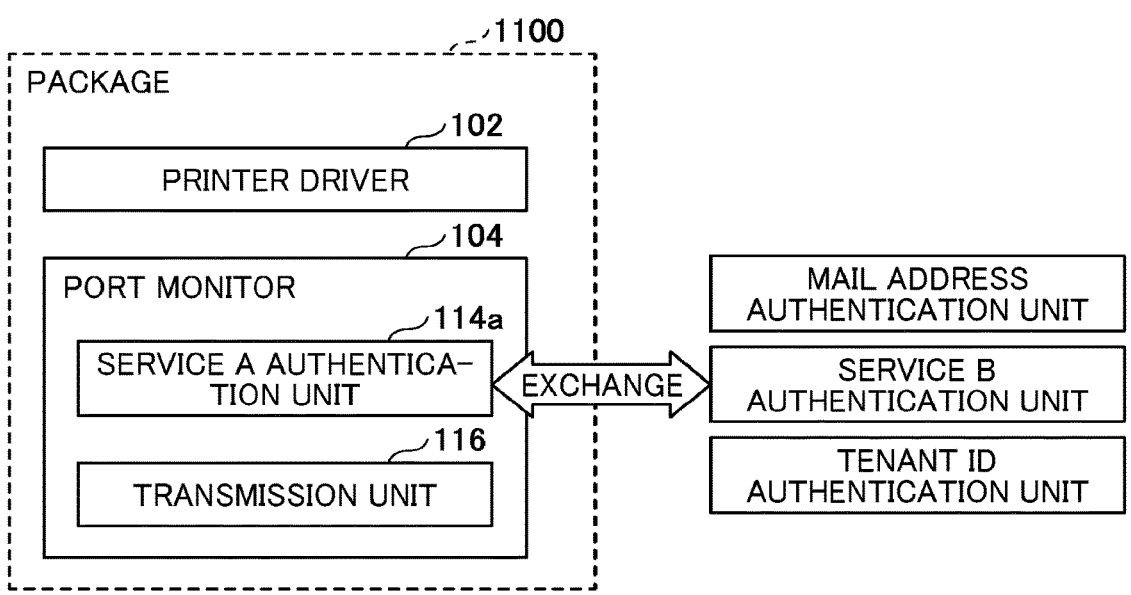
FIG. 11 is a block diagram illustrating another example of the package program to be downloaded.

The configuration of the package program is, for example, as illustrated in FIG. 10 or 11. FIG. 10 is a block diagram illustrating an example of the package program to be downloaded. FIG. 11 is a block diagram illustrating another example of the package program to be downloaded.

The package program 1100 of FIG. 10 includes the printer driver 102, the port monitor 104, and the setting file 106. FIG. 10 illustrates an example in which the login method is set by the authentication setting of the setting file 106. In the package program 1100 of FIG. 10, the login method of the port monitor 104 can be changed by changing the authentication setting of the setting file 106.

The package program 1100 of FIG. 11 includes the printer driver 102 and the port monitor 104. By changing the authentication unit 114a of the port monitor 104 for each login method, the login method of the port monitor 104 can be changed. For example, the package program 1100 of FIG. 11 illustrates an example of the port monitor 104 corresponding to the login method of "service A".

Figure 12:
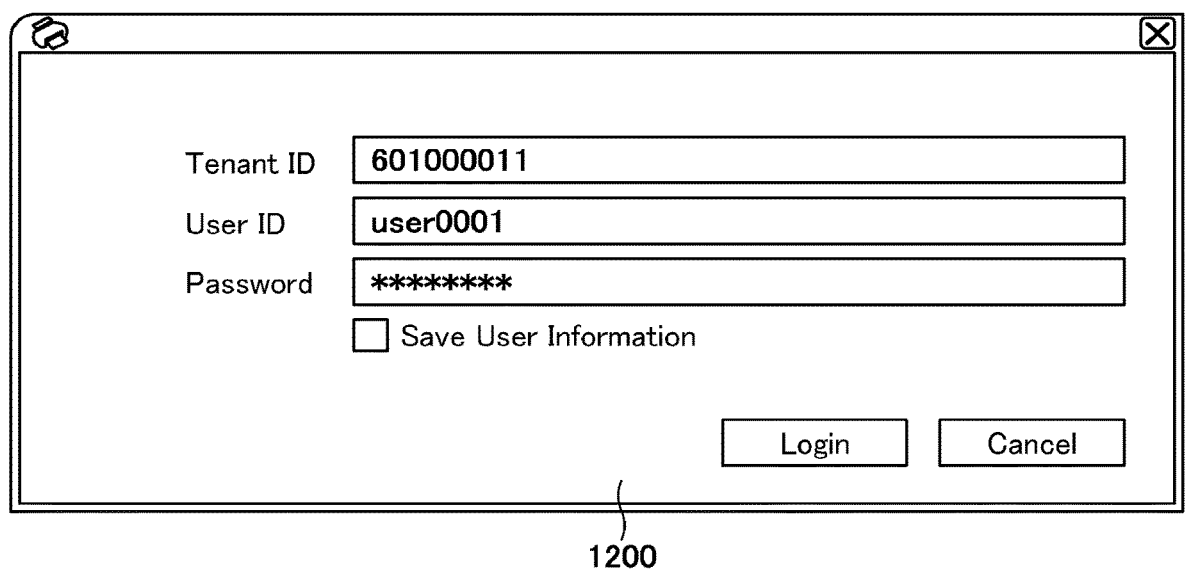
FIG. 12 is a diagram illustrating an example of a login screen when the login method is based on a user ID and a password.
Figure 13:
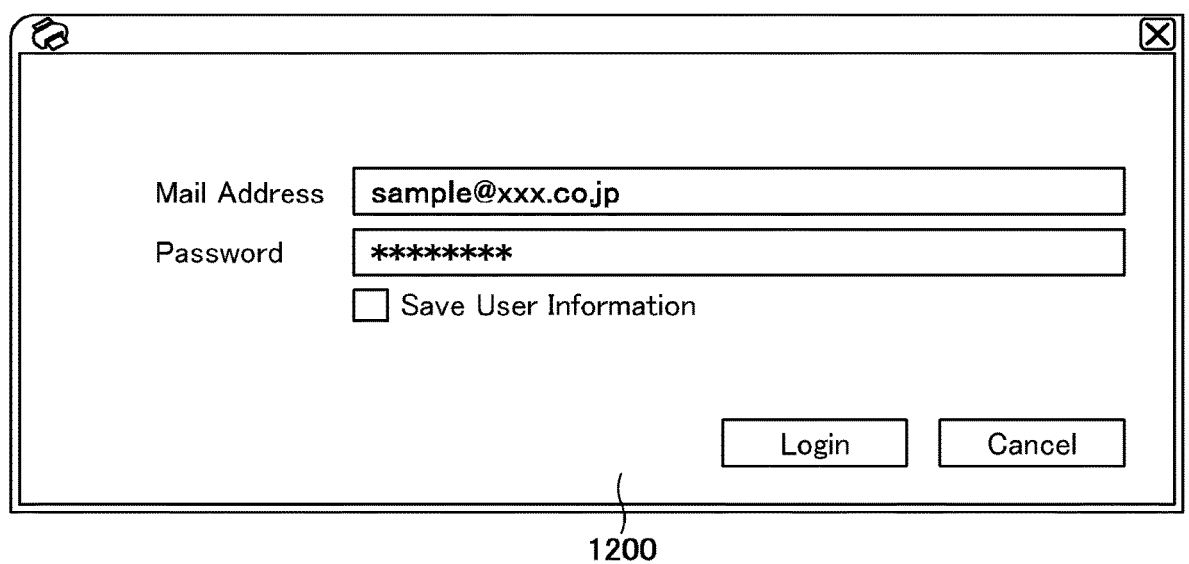
FIG. 13 is a diagram illustrating an example of the login screen when the login method is based on a mail address and a password.
Figure 14:
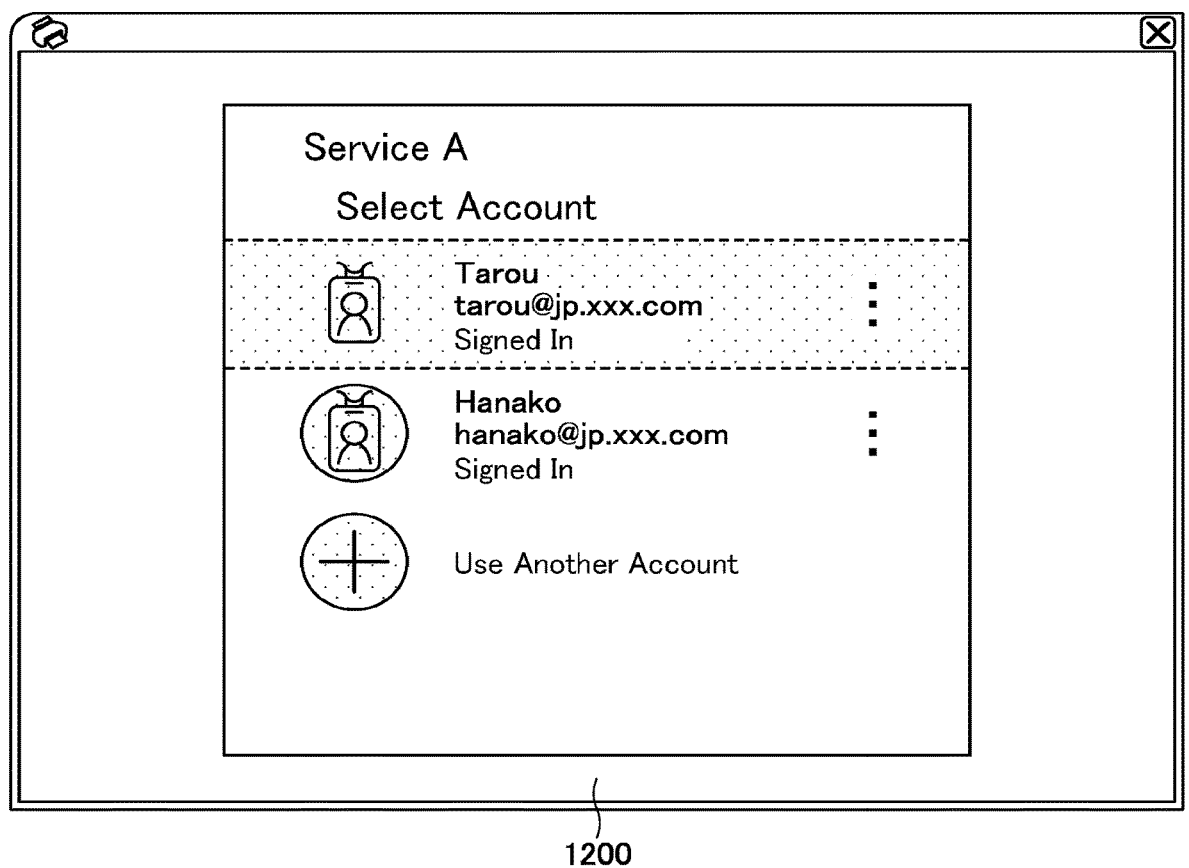
FIG. 14 is a diagram illustrating an example of the login screen when the login method is based on cooperation with an external service.

The port monitor 104 of the client terminal 10 including the package program 1100 according to the present embodiment downloaded and installed from the download screen 1002 displays a login screen 1200 as illustrated in FIGS. 12 to 14, for example.

FIG. 12 is an example of the login screen when the login method is based on the user ID and password. The tenant ID of the login screen 1200 in FIG. 12 may be set in the port monitor 104 in advance or may be input by the user each time login is performed.

The user can use the pull print service in the information processing system 1 according to the present embodiment by logging in by entering the user ID and password on the login screen 1200 of FIG. 12.

FIG. 13 is an example of the login screen when the login method is based on the email address and password. Since the login screen 1200 of FIG. 13 includes a unique email address, the tenant ID is omitted.

The user can use the pull print service in the information processing system 1 according to the present embodiment by logging in by entering the email address and password on the login screen 1200 of FIG. 13.

FIG. 14 is a diagram illustrating an example of the login screen when the login method is performed in cooperation with the external service. The user can use the pull print service in the information processing system 1 according to the present embodiment by logging in to "service A" from the login screen 1200 of FIG. 14 and linking authentication.

According to the present embodiment, by selecting a client program that can be used by the logged-in user and displaying the selected client program on the download screen, accidental download of the client program that cannot be used by the user is prevented. As a result, user convenience can be improved, and support cost can be reduced.

In the second embodiment, the license information possessed by the tenant is used to select the client program to be downloaded, displayed on the download screen 1002. Since a part of the second embodiment is the same as the first embodiment, the redundant description is omitted below.

FIG. 15 is a block diagram illustrating an example of a functional configuration of the service providing system according to the second embodiment. The service providing system 20 of FIG. 15 includes a license management service 32 added to the service providing system 20 of FIG. 3.

The license management unit 62 of the license management service 32 manages for each tenant, the license information of the tenant illustrated in FIGS. 16 and 17. The license management unit 62 uses, for example, the RDB to register, acquire, update, and delete data.

FIG. 16 is a diagram illustrating an example of a license information table included in the license information. The license information table in FIG. 16 includes items such as a license ID, a license type, a created date, and a status. The license ID is an example of identification information for uniquely identifying the license. The license type represents the type of license such as user license and device license. The created date represents the date when the license was created. The status represents the status of the license such as valid or invalid.

FIG. 17 is a diagram illustrating an example of a tenant-owned license information table included in the license information. The tenant-owned license information table of FIG. 17 includes items such as a management ID, the license ID, the tenant ID, quantity, a license start date, a license end date, and status.

The management ID is an example of identification information for managing the tenant-owned license information. The license ID is an example of identification information for uniquely identifying the license. The tenant ID is an example of identification information for uniquely identifying the tenant. The quantity represents the quantity of license. The license start date and license end date represent the start date and the end date of the license. The status represents the status of the license such as valid or invalid.

The license owned by the tenant is managed for each tenant according to the tenant-owned license information in FIG. 17.

Further, the download control unit 56 according to the second embodiment stores information on a license necessary for using the client program to be downloaded as illustrated in FIG. 18, for example. FIG. 18 is a diagram illustrating an example of license information stored in a download control unit necessary for using the client program to be downloaded.

FIG. 19 is a sequence diagram illustrating an example of processing of the information processing system according to the second embodiment. The user belonging to the tenant performs an operation for displaying the download screen 1002 on the browser 100 of the client terminal 10. Note that, in FIG. 19, the login process and the like for the service providing system 20 are omitted.

In step S20, the browser 100 requests the download control unit 56 of the service providing system 20 to display the download screen 1002. In step S22, the download control unit 56 acquires the tenant information of the logged-in user from the tenant information of the tenant management unit 60 illustrated in FIG. 5.

In step S22, the download control unit 56 refers to the license information in FIGS. 16 and 17 stored in the license management unit 62 and acquires the license information of the tenant to which the logged-in user belongs.

In step S26, the download control unit 56 determines the client program to be displayed on the download screen 1002 according to the login method of the tenant information acquired in step S22, the license information acquired in step S24, and the license information necessary for using the client program of the download target stored in the download control unit 56.

Then, the download control unit 56 creates image data of the download screen 1002 including the client program to be displayed on the determined download screen 1002 and matching the tenant settings. In step S28, the download control unit 56 transmits the image data of the download screen 1002 matching the tenant settings to the browser 100 of the client terminal 10 to display the download screen 1002 as illustrated in FIG. 8 or 9, for example.

Figure 20:
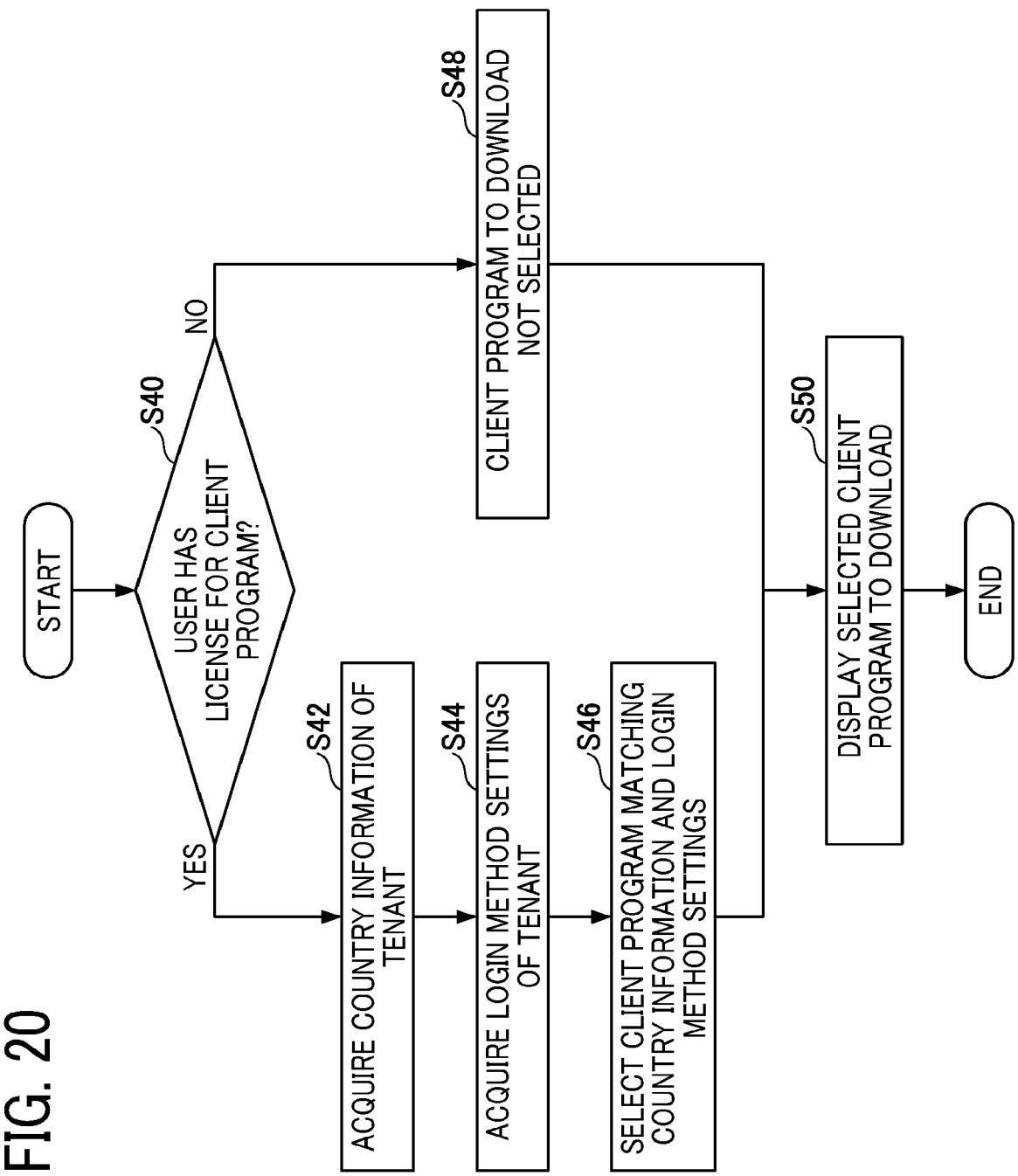
FIG. 20 is a flowchart illustrating an example of a process performed in step S26.

The process of step S26 may be performed, for example, according to a process illustrated in a flowchart of FIG. 20. FIG. 20 is the flowchart illustrating an example of the process performed in step S26.

In step S40, the download control unit 56 identifies the license required to use the client program to be downloaded from the information illustrated in FIG. 18. Further, the download control unit 56 identifies the license owned by the logged-in user from the license information acquired in step S24. Then, the download control unit 56 determines whether the logged-in user has the license required to use the client program to be downloaded by comparing the license required to use the target client program with the identified license of the logged-in user.

If the logged-in user has the license required to use the client program to be downloaded, the download control unit 56 proceeds to step S42 and acquires the country information of the tenant information acquired in step S22. In step S44, the download control unit 56 acquires the login method of the tenant information acquired in step S22.

Then, in step S46, the download control unit 56 selects a client program to be downloaded according to the acquired country information and login method. For example, the selection of the client program according to the country information is executed to select the printer driver 102 for the country when the type of the printer driver 102 differs depending on the country.

The process proceeds from step S46 to step S50, and the download control unit 56 determines the selected download target client program to be displayed on the download screen 1002. Then, the download control unit 56 creates the image data of the download screen 1002 including the client program to be displayed and matching the tenant settings, transmits the image data to the client terminal 10, and displays the download target client program on the download screen 1002 of the client terminal 10.

If the logged-in user does not have the license required to use the download target client program, the download control unit 56 proceeds to step S48 and does not select the download target client program.

In step S50, since the download control unit 56 does not have the selected download target client program, the download control unit 56 controls the client terminal 10 to display the download screen 1002 without the download target client program displayed. Alternatively, the download control unit 56 may control the client terminal 10 not to display the download screen 1002.

In the first and second embodiments, the package program to be downloaded is created in advance and stored in the storage 54. In the third embodiment, after determining the client program to be displayed on the download screen 1002, a download target package program 1100 as illustrated in FIG. 10 or 11 is created according to the client program to be displayed on the download screen 1002. Also in the third embodiment, after the client program to be downloaded is selected from the download screen 1002, the package program 1100 to be downloaded as illustrated in FIG. 10 or 11 is created according to the selected client program. The third embodiment is the same as the first or second embodiment except for some parts, and the description of the same parts is omitted.

FIG. 21 is a block diagram illustrating an example of a functional configuration of the service providing system according to the third embodiment. The service providing system 20 of FIG. 21 includes a package configuration service 34 added to the service providing system 20 of FIG. 15. The package configuration unit 64 of the package configuration service 34 creates the package program 1100 as illustrated in FIG. 10 or 11.

FIG. 22 is a sequence diagram illustrating an example of processing of the information processing system according to the third embodiment of the present disclosure. The user belonging to the tenant performs an operation for displaying the download screen 1002 on the browser 100 of the client terminal 10. Note that in FIG. 22, the login process and the like for the service providing system 20 are omitted.

In step S60, the browser 100 requests the download control unit 56 of the service providing system 20 to display the download screen 1002. In step S62, the download control unit 56 acquires the tenant information of the logged-in user from the tenant information of the tenant management unit 60 illustrated in FIG. 5.

In step S64, the download control unit 56 refers to the license information of the license management unit 62 illustrated in FIGS. 16 and 17 and acquires the license information of the tenant to which the logged-in user belongs.

In step S66, the download control unit 56 determines the client program to be displayed on the download screen 1002 according to the login method of the tenant information acquired in step S62, the license information acquired in step S64, and the license information necessary for using the client program of the download target stored in the download control unit 56.

Then, the download control unit 56 creates image data of the download screen 1002 including the client program to be displayed on the determined download screen 1002 and matching the tenant settings.

In step S68, the download control unit 56 requests the package configuration unit 64 of the package configuration service 34 to create the package program 1100 to be downloaded. The package configuration unit 64 creates the package program 1100 as illustrated in FIG. 10 or 11. The package program 1100 may be in a unique format such as an executable compressed file.

Then, in step S70, the download control unit 56 transmits the image data of the download screen 1002 that matches the tenant settings to the browser 100 of the client terminal 10 to display the download screen 1002 as illustrated in FIG. 8 or 9.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above. For example, the information sharing system according to the embodiments can be used in the following situations.

For example, the processing of step S14 of FIG. 7, the processing of steps S24 and S26 of FIG. 19, and the processing of steps S66 and S68 of FIG. 22, which were executed by the service providing system 20, may be executed by the client terminal 10, by transmitting necessary information to the client terminal 10.

Further, in the present embodiment, the port monitor 104 is described as an example of the client program corresponding to the login method, but the client program is not limited to the port monitor 104.

Each function of the embodiments described above can be implemented by one or a plurality of processing circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing system comprising:
at least one client terminal; and a service providing server, the service providing server comprising: circuitry configured to;
receive a request for downloading a client program to the client terminal from a user operating the client terminal;
determine a client program from a plurality of client programs according to a login method of the user, wherein the login method of the user is selected from a plurality of login methods, and a different client program is determined for each of the plurality of login methods, respectively; and
control to send the determined client program to the client terminal;
wherein the determined client program comprises a port monitor, a printer driver, and a setting file, and wherein a login method of the port monitor is set by an authentication setting of the setting file.

2. The information processing system of claim 1, wherein the client terminal comprises circuitry configured to:
display on a display the client program according to the login method of the user such that the client program is downloadable; and
receive a selection from the user of the client program to be downloaded to the client terminal.

3. The information processing system of claim 1, wherein the circuitry of the service providing server is further configured to:
manage a group to which a user who operates the client terminal belongs, and a login method set for each group; and
control to download the client program according to a login method set for a group to which the user belongs.

4. The information processing system of claim 1, wherein the circuitry of the service providing server is further configured to
display the client program according to the login method of the user as a downloadable client program.

5. The information processing system of claim 4, wherein the circuitry of the service providing server is further configured to:
manage license of a group to which the user belongs; and
when the group to which the user belongs does not have the license, control not to display as the downloadable client program even when the client program is according to the login method set for the group to which the user belongs.

6. The information processing system of claim 1, wherein the circuitry of the service providing server is further configured to
provide a package program including a port monitor according to the login method of the user and a printer driver for a country of the user as the client program sent to the client terminal, wherein the package program is capable of being installed by one click from the user.

7. The information processing system of claim 1, wherein the plurality of login methods comprise at least one of:
a first login method using a user ID and a password, a second login method using an email and a second password, and a third login method using an external service providing system.

8. The information processing system of claim 1, wherein the login method is selected from the plurality of login methods comprising:
a first login method using a user ID and a password, a second login method using an email and a second password, and a third login method using an external service providing system.

9. The information processing system of claim 1, wherein the determined client program comprises a port monitor configured to use the login method of the user.

10. The information processing system of claim 1, wherein none of the plurality of client programs are previously installed on the client terminal, and all of the plurality of client programs are available for download to the client terminal.

11. The information processing system of claim 1, wherein the circuitry of the service providing server is further configured to:
automatically send the determined client program to the client terminal.

12. The information processing system of claim 1, wherein the login method of the port monitor is set to match the login method of the user.

13. A service providing device comprising: circuitry configured to: receive a request for downloading a client program to at least one client terminal from a user operating the client terminal; and determine a client program from a plurality of client programs according to a login method of the user, wherein the login method of the user is selected from a plurality of login methods, and a different client program is determined for each of the plurality of login methods, respectively; and control to send the determined client program to the client terminal;
wherein the determined client program comprises a port monitor, a printer driver, and a setting file, and wherein a login method of the port monitor is set by an authentication setting of the setting file.

14. An information processing method executed by a service providing device comprising:
receiving a request for downloading a client program to at least one client terminal from a user operating the client terminal;
determining a client program from a plurality of client programs according to a login method of the user,
wherein the login method of the user is selected from a plurality of login methods, and a different client program is determined for each of the plurality of login methods, respectively; and
controlling to send the determined client program to the client terminal;
wherein the determined client program comprises a port monitor, a printer driver, and a setting file, and wherein a login method of the port monitor is set by an authentication setting of the setting file.

* * * * *